(12) United States Patent
Eller et al.

(10) Patent No.: US 6,362,312 B1
(45) Date of Patent: Mar. 26, 2002

(54) CATALYST AND METHOD FOR THE PRODUCTION OF POLYTETRAHYDROFURAN

(75) Inventors: Karsten Eller, Ludwigshafen; Heinz Rütter, Hochdorf-Assenheim; Michael Hesse, Worms; Rainer Becker, Bad Dürkheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/529,180

(22) PCT Filed: Jan. 15, 1999

(86) PCT No.: PCT/EP99/00220

§ 371 Date: Apr. 10, 2000

§ 102(e) Date: Apr. 10, 2000

(87) PCT Pub. No.: WO99/36459

PCT Pub. Date: Jul. 22, 1999

(30) Foreign Application Priority Data

Jan. 16, 1998 (DE) .................................. 198 01 462

(51) Int. Cl.⁷ ..................... C07C 43/11; C07C 67/24; C08G 59/68
(52) U.S. Cl. ................... 528/413; 560/240; 568/617
(58) Field of Search .................. 528/413; 568/617; 560/240

(56) References Cited

U.S. PATENT DOCUMENTS

| 3,433,829 | A |   | 3/1969  | Doerfelt |
| 3,454,596 | A | * | 7/1969  | Hamilton ................ 560/240 X |
| 4,127,513 | A | * | 11/1978 | Bellis .......................... 528/413 |
| 4,192,943 | A |   | 3/1980  | Robinson ..................... 528/417 |
| 4,228,272 | A |   | 10/1980 | Del Pesco ................... 528/413 |
| 4,480,124 | A | * | 10/1984 | Mueller ................... 568/617 X |
| 5,210,283 | A |   | 5/1993  | Kahn et al. ................. 560/240 |
| 5,614,572 | A |   | 3/1997  | Nesvadba et al. ........... 524/111 |
| 6,111,147 | A | * | 8/2000  | Sigwart et al. ............. 568/617 |

FOREIGN PATENT DOCUMENTS

| DE | 1 226 560 | 10/1966 |
| DE | 28 01 792 | 7/1979 |
| GB | 1128340 | 9/1968 |
| WO | WO 94/05719 | 3/1994 |

OTHER PUBLICATIONS

De 195 134 93 Derwent Abstract 1996.

* cited by examiner

Primary Examiner—Richard D. Lovering
(74) Attorney, Agent, or Firm—Keil & Weinkauf

(57) ABSTRACT

In a process for preparing polytetrahydrofuran, polytetrahydrofuran copolymers or diesters or monoesters thereof comprises polymerizing tetrahydrofuran in the presence of at least one telogen and/or comonomer over an acid-activated calcium montmorillonite as catalyst, the calcium montmorillonite has a BET surface area of at least 300 m²/g, an acidity of at least 0.02 mmol/g at $pK_a<-3$ and a pore volume of at least 0.40 cm³/g for pore sizes in the range from 30 to 200 Å.

9 Claims, No Drawings

CATALYST AND METHOD FOR THE PRODUCTION OF POLYTETRAHYDROFURAN

This application is a 371 of PCT/EP 99/00220, filed Jan. 15, 1999.

The present invention relates to an improved process for preparing polytetrahydrofuran, polytetrahydrofuran copolymers or diesters or monoesters of these polymers by polymerizing tetrahydrofuran in the presence of at least one telogen and/or comonomer over acid-activated calcium montmorillonites.

Polytetrahydrofuran ("PTHF"), also known as poly-(oxybutylene glycol), is a versatile intermediate in the plastics and synthetic fibers industry, inter alia for the preparation of polyurethane, polyester and polyamide elastomers, for which it is used as a diol component. In addition, polytetrahydrofuran and also some of its derivatives are valuable auxiliaries in many applications, for example as dispersants or for deinking waste paper.

In industry, PTHF is advantageously prepared by polymerization of tetrahydrofuran over suitable catalysts in the presence of reagents which make it possible to control the length of the polymer chains and thus to adjust the mean molecular weight to the desired value (chain terminators or telogens). The control is provided through choice of type and amount of telogen. Additional functional groups at one end or both ends of the polymer chain may be introduced by selection of suitable telogens. Thus, for example, the monoesters or diesters of PTHF can be prepared by using carboxylic acids or carboxylic anhydrides as telogens.

Other telogens act not just as chain terminators, but are also incorporated into the growing PTHF polymer chain. So they can be thought of as comonomers as well as telogens. Examples of such comonomers are water or telogens having two hydroxyl groups such as dialcohols. Examples of such dialcohols are ethylene glyco, butylene glycol, 1,4-butanediol, 1,6-hexanediol or low molecular weight PTHF. Suitable comonomers are furthermore 1,2-alkylene oxides, for example ethylene oxide or propylene oxide, 2-methyltetrahydrofuran or 3-methyltetrahydrofuran. With the exception of water, 1,4-butanediol and low molecular weight PTHF, the use of such comonomers leads to the formation of tetrahydrofuran copolymers. In this way, the PTHF can be chemically modified. An example is the use of the telogen 2-butyne-1,4-diol which leads to the presence of a proportion of $C_5 7 C$ triple bonds in the PTHF polymer chains. PTHF modified in this way can be further chemically modified at these sites owing to the reactivity of these triple bonds, for example by hydrogenation of the triple bonds to double bonds, by subsequent grafting with other monomers to adjust the properties of the polymer, by crosslinking to form polymers having a comparatively rigid structure, or by other conventional methods of polymer chemistry. Complete hydrogenation of the triple bonds present is likewise possible and generally leads to PTHF having a particularly low color number.

DE-B-1 226 560 describes a process for preparing polytetrahydrofuran diacetates. They are obtained by polymerizing tetrahydrofuran (THF) in the presence of bleaching earth catalysts. In particular, use is made of aluminum hydrosilicates or aluminum/magnesium silicates of the montmorillonite type which may be acid-activated. For example, an acidic montmorillonite earth having the trade name "Tonsil®" is used in conjunction with acetic anhydride as telogen.

PTHF diacetates obtained using the montmorillonites as described in DE-B-1 226 560 have a relatively high APHA color number. If a low color number product is desired, the mixture obtained according to DE-A-1 226 560 must be subjected to additional purification steps.

WO 94/05719 discloses a process for preparing polytetramethylene ether glycol diesters over an aluminum silicate catalyst. In addition to amorphous alumino-silicates or zeolites, acid-activated and calcined kaolins are used instead of known natural montmorillonites.

According to DE-C-195 13 493, polytetramethylene ether glycol diesters are prepared over magnesium/aluminum hydrosilicates of the attapulgite type as catalysts. It is claimed that the use of these catalysts instead of the known montmorillonite, zeolite or kaolin catalysts leads to higher polymerization rates and polymers having more uniform properties and a narrow molecular weight distribution.

U.S. Pat. No. 5,210,283 describes a process for preparing pTHF in the presence of acid anhydrides over an acid-activated bleaching earth that has been calcined at a temperature greater than 600° C. prior to use. The advantage of this process is a narrow molecular weight distribution of the resulting product, but the color number is not reduced thereby.

U.S. Pat. No. 4,127,513 describes a process for minimizing cyclic oligomers in THF/alkylene oxide copolymers over acid-activated montmorillonites having an acidity of from 0.1 to 0.9 milliequivalent of $H^+$ per g; an improvement in color number is not mentioned here either.

U.S. Pat. No. 4,228,272 describes an improvement over U.S. Pat. No. 4,127,513 which is achieved by using an acid-activated montmorillonite having a pore volume of 0.4–0.8 cm$^3$/g, a surface area of 220–260 m$^2$/g and an average pore volume of 0.1–0.3 μm. However, the catalyst used, KO® from Südchemie, only improves the color number in the initial stages of the polymerization.

However, the known catalyst systems are not sufficiently active to conduct the process on an industrial scale, in particular when technical grade THF is used.

It is an object of the present invention to provide a catalyst for a PTHF process which makes it possible to achieve higher polymer yields coupled with a lower polymer color number, since the economic viability of a heterogeneously catalyzed PTHF process is critically dependent on the productivity of the catalyst and the purity of the products obtained.

We have found that this object is achieved by a process for preparing polytetrahydrofuran, polytetrahydrofuran copolymers or diesters or monoesters thereof by polymerizing tetrahydrofuran in the presence of at least one telogen and/or comonomer over an. acid-activated calcium montmorillonite as catalyst having a BET surface area of at least 300 m$^2$/g, an acidity of at least 0.02 mmol/g at $pK_a<-3$ and a pore volume of at least 0.40 cm$^3$/g for pore sizes in the range from 30 to 200 Å.

The montmorillonites used according to the invention are clays, in particular members of the smectite family. In the process of the invention, naturally occurring or synthetic montmorillonites may be used. Preference is given to using natural calcium montmorillonites.

Montmorillonite catalysts are preferably activated in acid prior to use in the process of the invention. The activation can be carried out according to processes as described, for example, in DE-B-10 69 583 or EP-A-0 398 636. Various acids can be used for the acid activation, preference being given to the conventional mineral acids or to organic carboxylic acids. The acids are preferably selected from the group consisting of hydrochloric acid, sulfuric acid, nitric acid, phosphoric acid, formic acid, acetic acid or citric acid. Particular preference is given to sulfuric acid and/or hydrochloric acid.

The acid activation is effected by suspending the powdered montmorillonite in the acid, the solids content of the suspension being preferably from 1 to 70% by weight, particularly preferably from 20 to 60% by weight, based on the total weight of the suspension. The acid concentration depends on the acid and the type of clay used. It may vary within wide limits and is preferably in the range from 2 to 100%. When using sulfuric acid and hydrochloric acid, a concentration of from 20 to 50% is preferred. The suspension is preferably reacted at from 30 to 120° C., particularly preferably from 50 to 110° C., preferably for from 0.5 to 24 hours, particularly preferably from 1 to 15 hours, with stirring. The acid-activated montmorillonite is then separated off, for example by filtration, subsequently washed with distilled or deionized water to remove adhering traces of acid and then dried or calcined. The montmorillonite catalysts are advantageously dried at ambient pressure and at from 80 to 200° C., preferably from 100 to 150° C., for 1 to 20 hours. The catalysts can also be dried under reduced pressure and at lower temperatures. The dried catalysts are preferably calcined at from 150 to 600° C., particularly preferably from 200 to 500° C., especially from 300 to 500° C., for from 0.5 to 12 hours, preferably from 1 to 5 hours. The acid activation can also be effected in any other conventional manner. For example, the acid may be contacted with the montmorillonite by spraying or kneading with concomitant shaping.

The catalyst is preferably washed free from alkali metal ions by the acid treatment. To ensure a high activity, the finished catalyst preferably comprises less than 3% by weight, preferably less than 2% by weight, based on the total catalyst weight, of alkali metal ions (as determined after igniting at 900° C.).

Since water is a telogen capable of polymerizing with THF, it is advisable to subject the montmorillonite catalysts to drying and/or calcining under the above-described conditions prior to use when telogens/comonomers other than water are used.

The catalysts which can be employed according to the invention can be used in the THF polymerization process of the invention in the form of a powder, for example when carrying out the process in suspension, or advantageously as shaped bodies, for example in the form of cylinders, spheres, rings or granules, especially when the catalyst is arranged in a fixed bed, which is preferred when using, for example, loop reactors or when the process is carried out continuously.

Suitable telogens for use in the preparation of PTHF diesters are carboxylic anhydrides derived from $C_2$–$C_{20}$-monocarboxylic acids, for example acetic anhydride, propionic anhydride and butyric anhydride. PTHF diesters obtained on using these telogens may be converted into PTHF by various methods (as described in U.S. Pat. No. 4,460,796, for example).

Telogens used for the preparation of PTHF monoesters of monocarboxylic acids are generally $C_1$–$C_{20}$-monocarboxylic acids, particularly preferably formic acid, acetic acid, propionic acid, 2-ethylhexanoic acid, acrylic acid and methacrylic acid.

An example of a suitable telogen for the preparation of THF copolymers is 1,4-butynediol. The resulting copolymer may subsequently be converted into PTHF by hydrogenation of the triple bonds, but also exhibits interesting properties as such.

Other THF copolymers may be obtained by using 1,2-alkylene oxides, preferably ethylene oxide or propylene oxide, 2-methyltetrahydrofuran, 3-methyltetrahydrofuran or diols such as ethylene glycol or 1,6-hexanediol.

When using the telogens water and/or 1,4-butanediol, PTHF is obtained in one step in the process of the invention. It is also possible, if desired, to recycle low molecular weight, open-chain PTHF having a molecular weight of from 200 to 700 dalton into the polymerization reaction to act as a telogen and to be converted into higher molecular weight PTHF. Since 1,4-butanediol and low molecular weight PTHF have two hydroxyl groups, they are incorporated in the PTHF chain not only terminally as telogens but also internally as monomers.

The telogen is advantageously added to the polymerization as a solution in THF. Since the telogen causes the termination of the polymerization, the average molecular weight of the PTHF or of the PTHF diester can be controlled by means of the amount of telogen used. The greater the amount of telogen present in the reaction mixture, the lower the average molecular weight of the PTHF or of the relevant PTEF derivative. Depending on the telogen content of the polymerization mixture, PTHF or the relevant PTHF derivatives having average molecular weights of from 250 to 10,000 dalton can be prepared in a controlled manner. The process of the invention is preferably used to prepare PTHF or the relevant PTHF derivatives having average molecular weights of from 500 to 10,000 dalton, particularly preferably from 650 to 5000 dalton.

The polymerization is generally carried out at from 0 to 80° C., preferably at from 25° C. to the boiling temperature of THF. The pressure employed is generally not critical for the result of the polymerization, which is therefore generally carried out at atmospheric pressure or under the autogeneous pressure of the polymerization system, except for copolymerizations of THF with the volatile 1,2-alkylene oxides, which are advantageously carried out under superatmospheric pressure.

The pressure is generally in the range from 0.1 to 20 bar, preferably from 0.5 to 2 bar.

To avoid the formation of ether peroxides, the polymerization is advantageously carried out under an inert gas atmosphere. Inert gases which can be employed are, for example, nitrogen, carbon dioxide or noble gases, with nitrogen being preferred.

It is particularly advantageous to carry out the polymerization under a hydrogen atmosphere. This embodiment leads to polymers having a particularly low color number. The hydrogen partial pressure may be from 0.1 to 50 bar in this case. When the polymerization is carried out in the presence of hydrogen, the color number can be further improved by doping the calcium montmorillonite with transition metals of groups 7 to 10 of the periodic table of the elements, for example with ruthenium, rhenium, nickel, iron, cobalt, palladium and/or platinum.

The process of the invention can be carried out batchwise or continuously, a continuous process being generally preferred for economic reasons.

In the batch process, the THF, the relevant telogen and the catalyst are generally reacted at the abovementioned temperatures in a stirred tank or in a loop reactor until the desired conversion of THF is achieved. The reaction time may be 0.5–40 hours, preferably 1–30 hours, depending on the amount of catalyst added. The catalysts are generally used in the polymerization in an amount of 1–90% by weight, preferably 4–70% by weight, particularly preferably 8–60% by weight, based on the weight of the THF used.

In the batchwise process, the reaction effluent is worked up by removing the catalyst present in the effluent, conveniently by filtration, decanting or centrifugation. The polymerization effluent freed from catalyst is generally worked up by distillation, in which case unconverted THF is advantageously distilled off and then, if desired, low molecular weight PTHF oligomer is removed from the polymer by distillation under reduced pressure.

The catalysts which are particularly active according to the process of the invention have been prepared by acid activation of calcium montmorillonites in such a way that they have a BET surface area of at least 300 m$^2$/g, an acidity of at least 0.02 mmol/g at $pK_a<-3$ and a pore volume of at least 0.40 cm$^3$/g for pore sizes in the range from 30 to 200 Å.

The BET surface area (5-point method) and the pore volume are obtained from the nitrogen adsorption/desorption isotherms. The pore volume in the range from 30 to 200 Å is determined by analysis of the BJH desorption distribution. To this end the cumulative pore volume at an average pore diameter of 200 Å is subtracted from the cumulative pore volume at 30 Å. The acidity is determined by titration against the Hammett indicator dicinnamylideneacetone ($pK_a=-3.0$), as described in detail in Tanabe et al., New Solid Acids and Bases, Stud. Surf. Sci. Catal. 51, 1989, Chapter 2, and Benesi, J. Phys. Chem. 61, 1957, 970–973. To determine the acidity, the dried catalyst is suspended in an inert aprotic solvent such as toluene followed by addition of the indicator having a defined $pK_a$ of –3 and n-butylamine or a similar base. Since the reaction of the solid acid with the base is slow, the titration cannot be carried out in the conventional manner by means of a burette, instead increasing amounts of base are added to a plurality of batches, the mixtures are shaken overnight and the next morning, after equilibration, are checked to determine which amount of base has caused a color change. A quantitative measure of the number of acidity centers in mmol of base per gram of solid acid below the $pK_a$ of the indicator, i.e. –3, is thus obtained.

The calcium montmorillonite preferably has a BET surface area of from 300 to 400 m$^2$/g. The acidity is preferably from 0.02 to 0.1 mmol/g at $pK_a<-3$. The pore volume for pore sizes in the range from 30 to 200 Å is preferably from 0.40 to 1.0 cm$^3$/g.

The catalysts known to date for the polymerization of THF (Tonsils®, K 10®, KO®, KSF®, KP 10® etc. (see DE-B-1 226 560, DE-A-28 01 792, U.S. Pat. No. 4,228, 272)) are prepared from sodium montmorillonites by acid activation and do not meet the requirements of the invention with regard to BET surface area, pore volume and acidity.

The Examples which follow illustrate the invention.

EXAMPLES

Catalyst Preparation

Comparative Catalyst V1

Comparative catalyst V1 as an acid-activated sodium montmorillonite (Tonsil Optimum 210 FF® from Südchemie) having a BET surface area of 239 m$^2$g$^{-1}$, a pore volume of 0.31 cm$^3$g$^{-1}$ in the range from 30 to 200 Å and zero acidity $<pK_a-3$.

Comparative Catalyst V2

Comparative catalyst V2 was an. acid-activated sodium montmorillonite (K 10® from Südchemie) having a BET surface area of 270 m$^2$g$^{-1}$, a pore volume of 0.35 cm$^3$g$^{-1}$ in the range from 30 to 200 Å and an acidity of 0.037 mmol g$^{-1}$<$pK_a-3$.

Catalyst A

Catalyst A was an acid-activated calcium montmorillonite (XMP-4® from Laporte) having a BET surface area of 327 m$^2$g$^{-1}$, a pore volume of 0.56 cm$^3$g$^{-1}$ in the range from 30 to 200 Å and an acidity of 0.042 mmol g$^{-1}$<$pK_a-3$.

Comparative Catalyst V3

Comparative catalyst V3 consisted of extrudates of comparative catalyst V2. To this end, the K 10 powder was mixed with water in a kneader and extruded in an extruder. The resulting extrudates were then calcined at 350° C.

Comparative Catalyst V4

Comparative catalyst V4 was an acid-activated sodium montmorillonite (KO® from Südchemie) having a BET surface area of 264 m$^2$g$^{-1}$.

Catalyst B

Catalyst B consisted of extrudates of catalyst A. To this end, the XMP-4 powder was mixed with water in a kneader and extruded in an extruder. The resulting extrudates were then calcined at 350° C.

Polymerization

Example 1

182 g of tetrahydrofuran and 18 g of acetic anhydride are introduced into a 500 ml stirred flask and heated to 50° C. 10 g of catalyst are added with stirring (180 rpm) and the mixture is stirred at 50° C. for 45 min. The catalyst is then filtered off using a pressure filter and the color number of the filtrate is determined. The filtrate is then evaporated on a rotary evaporator (30 min at 150° C./1013 mbar and 30 min at 150° C./0.2–0.3 mbar). The pTHF diacetate obtained is weighed to determine the conversion.

The results are shown in Table 1.

TABLE 1

| Catalyst | Conversion [%] | Color number of filtrate [APHA] |
| --- | --- | --- |
| V1 | 8.3 | 25 |
| V2 | 28.9 | 15 |
| A | 34.4 | 5 |
| V4 | 15.3 | 17 |

The Examples clearly demonstrate the advantages of the catalyst of the invention over the prior art comparative catalysts V1, V2 and V4: the conversion is higher while the color number is actually lower.

Example 2

A circulation reactor was packed with 1.2 liters of catalyst extrudates in each case. The reactor was charged with 60 ml/h of a THF/acetic anhydride mixture (6.9% by weight of acetic anhydride) as feed (downflow mode, flooded system); the recirculation rate was 8 l/h. The feed was increased to 90 ml/h after 13 days and to 120 ml/h after 33 days at the same circulation rate. Each day, the color number of the effluents was determined and the effluents were then evaporated on a rotary evaporator (30 min at 150° C./1013 mbar and 30 min at 150° C./0.2–0.3 mbar). The pTHF diacetate thus obtained is weighed to determine the conversion. The results for the catalysts V3 and B at their respective settings are shown in Table 2. No deactivation was observed within the run time of 40 days each; the conversions and color numbers of the effluents were constant each time. The molecular weight was about 900 dalton in each case.

TABLE 2

| Catalyst | Feed [ml h$^{-1}$] | Conversion [%] | Color number of filtrate [APHA] |
|---|---|---|---|
| V3 | 60 | 57.5 | 100 |
| B | 60 | 57.5 | 90 |
| V3 | 90 | 55.5 | 150 |
| B | 90 | 55.5 | 90 |
| V3 | 120 | 54.0 | 150 |
| B | 120 | 54.0 | 90 |

Comparison of the results shows that catalyst B according to the invention provides a significantly lower color number than comparative catalyst V3 at the same (equilibrium) conversion. In the initial phase, catalyst B also reached the equilibrium state significantly faster, reflecting its higher activity.

We claim:

1. A process for preparing polytetrahydrofuran, polytetrahydrofuran copolymers or diesters or monoesters thereof, which comprises polymerizing tetrahydrofuran in the presence of at least one telogen and/or comonomer over an acid-activated calcium montmorillonite as catalyst having a BET surface area of at least 300 m$^2$/g, an acidity of at least 0.02 mmol/g at p$K_a$<−3 and a pore volume of at least 0.40 cm$^3$/g for pore sizes in the range from 30 to 200 Å, And wherein the telogen and/or comonomer is water, 1,4-butanediol, 2-butyne-1,4-diol, polytetrahydrofuran having a molecular weight of from 200 to 700 dalton, a $C_1$–$C_{20}$-monocarboxylic acid, a $C_2$–$C_{20}$ monocarboxylic anhydride, a 1,2-alkylene oxide, 2-methyltetrahydrofuran, 3--methytetrahydrofuran, a diol or a mixture thereof.

2. A process as claimed in claim 1, wherein the calcium montmorillonite has a BET surface area of from 300 to 400 m$^2$/g.

3. A process as claimed in claim 1, wherein the calcium montmorillonite has an acidity of from 0.02 to 0.1 mmol/g at p$k_a$<−3.

4. A process as claimed in claim 1, wherein the calcium montmorillonite has a pore volume of from 0.40 to 1.0 cm$^3$/g for pore sizes in the range frp, 30 to 200 Å.

5. A process as claimed in claim 1, wherein the montmorillonite is calcined at from 150 to 600° C. prior to use in the polymerization.

6. A process as claimed in claim 1, wherein the catalyst is doped with at least one transition metal of groups 7 to 10 of the periodic table of the elements.

7. A process as claimed in claim 1, wherein the catalyst comprises less than 3% by weight of alkali metal ions, based on the total catalyst weight.

8. A process as claimed in claim 1, wherein the telogen used is acetic anhydride.

9. A process as claimed in claim 1, wherein the polymerization is carried out in the presence of hydrogen.

* * * * *